United States Patent [19]
Maingot

[11] Patent Number: 5,191,782
[45] Date of Patent: Mar. 9, 1993

[54] DEVICE FOR GAUGING A VOLUMETRIC METER

[75] Inventor: Georges F. D. Maingot, Villepreux, France

[73] Assignee: Mesure Controle et Automatisme Mestrole, France

[21] Appl. No.: 599,303

[22] Filed: Oct. 17, 1990

[30] Foreign Application Priority Data

Oct. 17, 1989 [FR] France ................................ 89 13565

[51] Int. Cl.$^5$ ............................................. G01F 25/00
[52] U.S. Cl. ................................................. 73/3
[58] Field of Search ........... 73/3, 1 H, 861.01, 861.02, 73/861.03, 204.18, 204.19, 233, 861.81, 861.82, 861.83, 861.84; 364/571.01–571.08, 510

[56] References Cited

U.S. PATENT DOCUMENTS

| | | | |
|---|---|---|---|
| Re. 31,432 | 11/1983 | Francisco, Jr. ............................ | 73/3 |
| 3,083,570 | 4/1963 | Truman ................................... | 73/3 X |
| 3,492,856 | 2/1970 | Francisco, Jr. ............................ | 73/3 |
| 3,933,027 | 1/1976 | Mehall ..................................... | 73/3 |
| 4,120,032 | 10/1978 | Mirdadian ............................... | 364/510 |
| 4,566,307 | 1/1986 | Boykin ..................................... | 73/3 |
| 4,569,220 | 2/1986 | Hopfe et al. .............................. | 73/3 |
| 4,628,724 | 12/1986 | Maurer ..................................... | 73/3 |
| 4,631,951 | 12/1986 | Böhm ....................................... | 73/3 |
| 4,637,244 | 1/1987 | Maurer et al. ............................ | 73/3 |
| 4,794,785 | 1/1989 | Cohrs et al. .............................. | 73/3 |
| 4,831,866 | 5/1989 | Forkert et al. ............................ | 73/3 |
| 5,052,211 | 10/1991 | Cohrs et al. .............................. | 73/3 |
| 5,052,212 | 10/1991 | Cohrs ....................................... | 73/3 |
| 5,072,416 | 12/1991 | Francisco, Jr. et al. ........ | 364/510 X |

FOREIGN PATENT DOCUMENTS

| | | | |
|---|---|---|---|
| 242937 | 10/1987 | European Pat. Off. . | |
| 8607146 | 12/1986 | PCT Int'l Appl. . | |
| 8700622 | 1/1987 | PCT Int'l Appl. . | |
| 2171210 | 8/1986 | United Kingdom ..................... | 73/3 |

*Primary Examiner*—Tom Noland
*Attorney, Agent, or Firm*—Ostrolenk, Faber, Gerb & Soffen

[57] ABSTRACT

A method of and device for gauging a liquid meter, the device comprising an enclosure containing a piston and hydraulically connectable to the measuring member of the meter, the piston being a plunger piston with a cross-section smaller than that of the enclosure and being mounted for a sliding motion in fluid-tight relationship through a wall mounted transversely within the enclosure to there define two fluid-tight capacities between which the piston moves in plunging relationship.

6 Claims, 1 Drawing Sheet

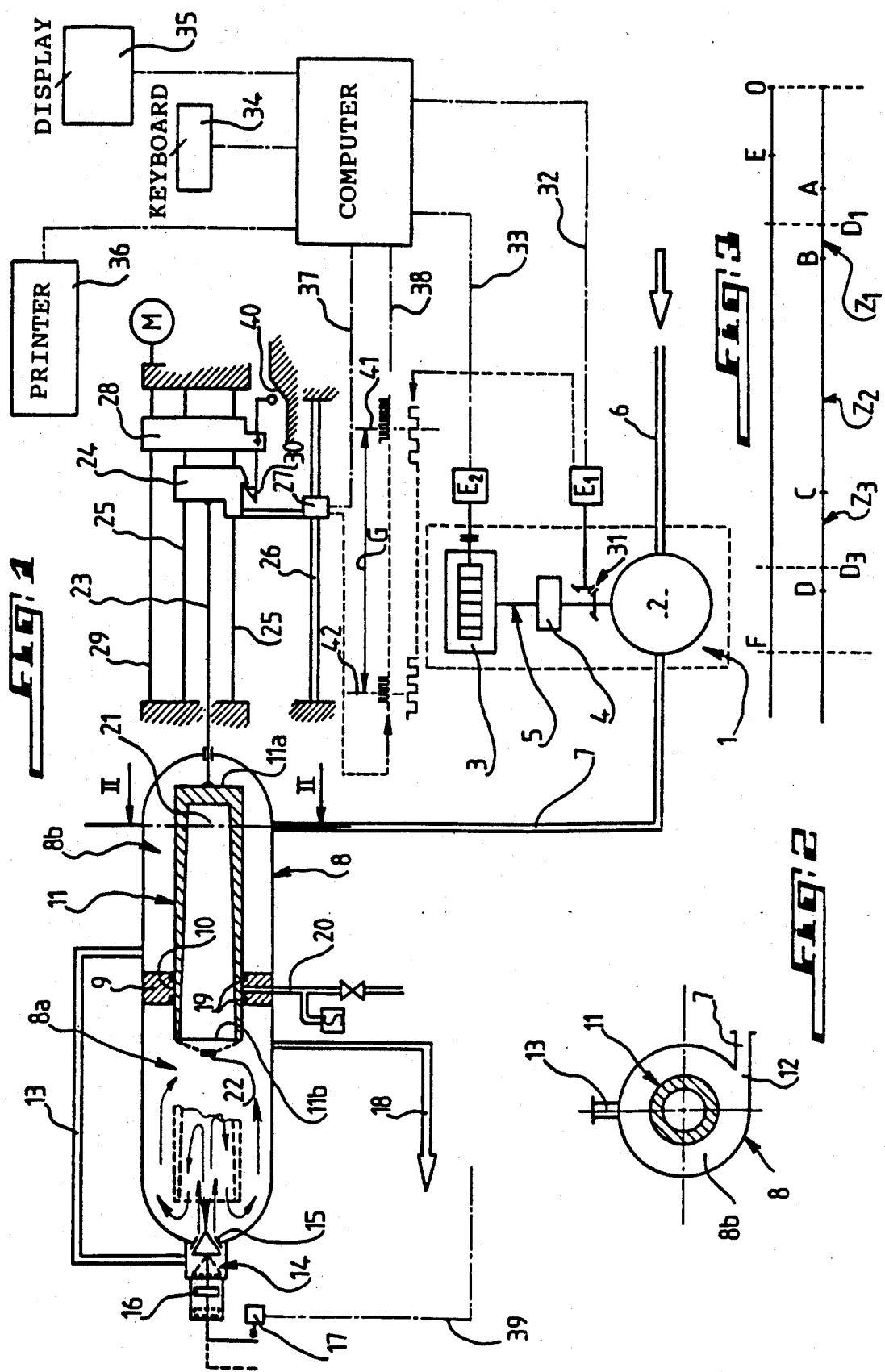

DEVICE FOR GAUGING A VOLUMETRIC METER

BACKGROUND OF THE INVENTION

1. Field of the Invention

The present invention relates essentially to a method of gauging or standardizing a liquid meter, in particular a volumetric meter.

It is also directed to a gauging or standardizing device for carrying out the method.

2. Description of the Related Art

It is known that the step of gauging or standardizing a liquid meter aims at allowing to adjust the value of liquid volume indicated on the meter to the true value of liquid volume which has actually flown through the meter.

This gauging or standardizing step may be performed on those volumetric meters as well as on those meters with a turbine which are presently found on the market.

It is already known to carry out the gauging by means of a piston moving between two stationary positions within a cylinder and which generates a volume compared with an interpolated value of the volume shown on the meter.

This system however suffers from an inconvenience in particular in the case of volumetric meters since the method of interpolation is inconsistent with the desired gauging accuracy.

There are moreover known gauging systems with a piston sliding within a cylinder connected to the meter and the volume of which may be divided in order to be adapted to or to match a predetermined value of the volume read on the meter.

Such a system however does not allow to achieve the gauging accuracy sought in view of the lack of cylindricity of the cylinder in which the piston is sliding and also because of the operational distorsion which exists between the measuring member of the meter and the volume indicator of this meter and this in the case of the volumetric meters which are generally provided with a kinematic drive chain or line with a trouble or disturbances generating gearing and on which is generally provided a control system allowing to adjust the value of the volume read on the indicator of the meter to the true value of the liquid volume which has moved through this meter.

SUMMARY OF THE INVENTION

The object of the present invention is to cope with the inconveniences referred to hereinabove by providing a method of and a device for gauging or standardizing a volumetric or even a turbine meter, which allow to achieve a very high degree of accuracy and this with an outstanding reliability of gauging one meter or another one.

For that purpose the subject matter of the invention is a method of gauging or standardizing a volumetric meter of any type whatsoever for a liquid, essentially comprising a measuring member and a volume indicator connected by any mechanical system whatsoever necessarily generating an error on the volume read on the indicator with respect to the true volume flowing through the measuring member, this error being susceptible of being corrected by a control system, this method being essentially characterized by the step of establishing the ratio of the number of pulses produced on the one hand by a first pulse generator arranged between the measuring member and the control system and on the other hand by a second pulse generator driven by the indicator producing a disturbed information and this so as to quantize as a volume value read on the indicator the undisturbed information emitted by the first pulse generator to thus determine with the required degree of accuracy the volume value read to be compared with the true volume having flown through measuring member which directly causes the first pulse generator to be driven.

This method is still characterized in that the liquid volume flowing through the measuring member actuates a piston sliding within an enclosure and the displacement of which representing the true volume of liquid having flown through the measuring member is measured over a distance comprising three zones defined by four limits themselves defined with respect to an origin of reference measure, so that the measurement of the displacement of the piston necessarily starting in the first zone and necessarily ending in the third zone includes the measurement of an intermediate zone of stationary position and magnitude to therefore make negligible the measuring errors ascribable to the readings of the measure of the displacement of the piston.

The invention is also directed to a device for gauging a volumetric meter of any kind whatsoever for a liquid, for carrying out the method meeting the above-mentioned characterizing features and comprising an enclosure containing a piston and hydraulically connectable to the measuring member of the meter, this device being essentially characterized in that the said piston is a plunger piston with a cross-section smaller than that of the enclosure and mounted for sliding in sealing or fluid-tight relationship through at least one wall arranged transversally within the enclosure to there define at least two fluid-tight capacities.

According to another characterizing feature of this device both aforesaid capacities which are connectable to the circuit for carrying the liquid passing into the measuring member of the meter communicate with each other by at least one duct provided with at least one valve arranged along the centre line axis of the piston and allowing a progressive flow of the liquid from one capacity towards the other one or its discontinuance.

It should further be specified here that the piston is coupled to a first carriage sliding on guides in parallel relation to an incremental measuring ruler and which may be drawn back by a second powered carriage.

According to still another important characterizing feature the device of this invention comprises a first pulse generator directly coupled to the motion of the measuring member of the meter as well as a second pulse generator directly coupled to the volume indicator of the meter, these two generators sending their information to a computer and likewise the information from the aforesaid measuring ruler are adressed to this computer.

According to still a further characterizing feature of this invention the piston has an inner cavity opening at one of the ends of the piston, which end is provided with an abutment adapted to co-operate with the aforesaid valve.

It should further be pointed out here that the liquid input connection to one of the capacities of the enclosure advantageously is a connection with a tangential injection allowing a centrifugation of the liquid entering the enclosure to thereby direct the solid particles suspended in the liquid towards the walls of the enclosure and not towards the piston, whereby the damaging of the outer surface thereof is avoided.

According to still another characterizing feature of the invention with the aforesaid valve arranged along the centre line axis of the sliding motion of the piston is associated a system for controlling or monitoring the valve in the closing position.

It is further possible to provide according to the invention a duct associated with a pressure source, which duct communicates with the interface between the opening of the wall in which the piston is sliding and the outer surface thereof and opens between two seals or packing joints disposed within this opening.

Thus it will be advantageously possible to relieve both sealing joints or packings and therefore to reduce the harmful rubbing effects of the sealing joints or packings onto the piston while retaining the sealed relationship or fluid-tightness between the wall and the piston sliding within this wall.

BRIEF DESCRIPTION OF THE DRAWINGS

The invention will be better understood and further characterizing features, details and advantages thereof will better appear as the following explanatory description proceeds with reference to the accompanying diagrammatic drawings given by way of non limiting example only and wherein:

FIG. 1 is a diagrammatic view of a gauging system according to this invention shown in the position connected to a meter which is desirably to be gauged;

FIG. 2 is a view in section taken substantially upon the line II—II of FIG. 1; and FIG. 3 is a chart illustrating in the upper portion thereof the stroke of the reading head on the incremental ruler and in the lower portion thereof the position of the information addressed to the computer by the reading head.

DETAILED DESCRIPTION OF THE PREFERRED EMBODIMENT

According to the examplary embodiment shown on FIG. 1 a gauging device according to the principles of the invention is connected to a volumetric meter 1 which as known per se comprises a measuring member 2, an indicator 3 of the value of liquid volume passing into the measuring member 2 and a control system 4 between the indicator 3 and the measuring member 2, which system may act upon a kinematic chain or line with a gear train diagrammatically shown at 5 and connecting the measuring member 2 to the indicator 3.

The measuring member 2 receives any liquid whatsoever by a duct or pipeline 6, which liquid flows out through a duct 7 to be led into an enclosure 8 forming the standardizing gauge according to this invention.

Within the enclosure 8 is transversally mounted a wall or partition 9 with an opening 10 in which is slidably mounted a plunger piston 11 which as well seen on the Figure has a diameter smaller than that of the enclosure 8.

As clearly appearing from FIG. 2 the duct 7 opens into the enclosure 8 through a connection 12 with tangential injection.

The wall or partition 9 defines within the enclosure 8 two fluid-tight or sealed capacities 8a, 8b. The tangential connection 12 of the duct 7 leading into the compartment 8b allows to subject the liquid entering this compartment to a vortex or swirling and circular motion so that the particles possibly suspended within the liquid will not be able to spoil or impair the outer surface of the piston 11 since they will necessarily be projected or thrown towards the inner surface of the enclosure 8 from which they may be discharged.

The fluid-tight capacity 8b communicates with the other fluid-tight capacity 8a through a duct 13 and this through the agency of a valve 14 made fast with the enclosure 8 and arranged along the centre line axis of sliding motion of the plunger piston 11. This valve 14 as well seen on the Figure co-operates with a seat 15 made fast with the wall of the enclosure 8 and it comprises a follow-up or servo-system 16 co-operating with a switch 17 so as to control the closing of the valve and to enable the measurement of the gauging as will be explained later in connection with the operation.

At 18 is shown an outlet duct for the liquid from the capacity 8a of the enclosure. Without leaving the scope of the invention it should be understood that the meter 1 to be gauged could be indifferently placed upstream or downstream of the standardizing gauge or enclosure 8.

The sealing relationship or fluid-tightness of the plunger piston 11 with respect to the opening 10 of the wall 9 is provided by two seals or packings 19 between which may open a duct 20 connected to a pressure source S such for instance as a pump.

Thus a fluid under pressure may possibly feed the interface between the piston 11 and the opening 10 and this between both seals 19 as well seen on the Figure so as to relieve in a way both seals 19 and avoid the effects of friction upon the outside surface of the piston 11 which would be detrimental to the gauging measurement. It should be pointed out here that the duct 20 may also and advantageously be used for checking the fluid-tightness or sealing relationship between both seals or packing joints 19 and this during the sliding motions of the plunger piston 11. It should be emphasized here that the standardizing gauge according to this invention is very advantageous in relation to the gauging accuracy since the piston 11 may be manufactured through outside machining thereby guaranteeing a perfect geometry. In other words according to the present invention there is no need to machine a piston-cylinder assembly with all the cylindricity hazards incurred thereby.

The plunger piston 11 is hollowed out so as to form a preferably frusto-conical inner cavity 21 opening with one end into the capacity 8a, this end being provided with an abutment diagrammatically shown at 22 and susceptible of actuating the valve 14 to force it open in case of failure of the follow-up interlocking or servo-system 16, so that the liquid passing into the duct 13 is automatically discharged through the duct 18.

The other non-opening end of the piston 21 is coupled by a rod or the like 23 to a first carriage 24 displaceable on two parallel guides diagrammatically shown at 25. This first carriage slides on the guides 25 in parallel relation to an incremental measurement ruler 26. A sensing or reading head 27 of the ruler 26 is mechanically connected by any suitable means whatsoever to the first carriage 24.

At 28 is shown a second carriage sliding on guides 25 and which may be driven by a motor M and a ball screw 29 so as to allow the first carriage 24 to be drawn back or returned when the plunger piston 11 is at the end of its stroke, i.e. located for its major part inside of the capacity 8a of the enclosure 8. More precisely the second carriage 28 comprises a hooking system diagrammatically shown at 30 and capable of co-operating with the first carriage 24 to draw the piston 11 back towards the launching position, i.e. the position shown on FIG. 1.

At $E_1$ is shown at first pulse generator directly connected by any suitable means whatsoever to the driving mechanism of the measuring member 2 so that the drive of the generator $E_1$ will neither be influenced nor disturbed by the kinematic line or gear train 5 between the measuring member 2 and the indicator 3. The pulses produced by the generator $E_1$ are sent to a computer C through the line 32.

At $E_2$ is shown a second pulse generator which is directly coupled to the indicator 3 and the signal or pulses of which are sent to the computer C through the line 33. This computer C comprise as known per se a keyboard 34, a visualizing or display screen 35 and a printer 36.

It should be further pointed out that to this computer C are sent the information from the reading head 27 as designated by the line 37. The computer C further may generate information conveyed to him by the line 38 from various appliances for measuring the pressure and the temperature at different points of the system.

At 39 is at least shown a line connecting the switch 17 to the computer C.

Having thus described the gauging system according to this invention, the operation thereof will now be set forth.

One should start from the position seen on FIG. 1 and wherein the plunger piston 11 is at the end of the reset cycle, i.e. the first carriage 24 is still drawn back by the second carriage 28 towards the right-hand side of FIG. 1.

When the lever-like hooking system 30 is biased by the stroke end cam designated at 40 the first carriage 24 separates from the second carriage 28 which keeps moving towards the right-hand side of FIG. 1.

The carriage 24 therefore is in the initial launching position, i.e. in the position ready to begin a measurement. At this stage it should be noted that the valve 14 is in the open position as shown in dotted lines on FIG. 1 and this under the effect of the servo-system 16.

The liquid having flown through the meter and passing into the duct 7 enters the capacity 8b and flows out therefrom freely through the duct 13 to pass through the medium of the open valve 14 into the capacity 8a from which it flows out through the duct 18.

When the operator wishes to begin the measurement he operates the closure of the valve 14 by acting upon the servo-system 16. The gradual restriction of the flow through the valve 14 will then result in an increase in the head or pressure loss between the capacities 8a and 8b, so that the piston 11, undergoing at its end 11a a pressure higher than that applied to its openings end 11b, will displace itself and plunge at first progressively towards the capacity 8a. Then the gradual speed of the piston 11 will reach its maximum value when the valve 14 will be fully closed. This speeds corresponds to the flow rate of liquid moving out from the measuring member 2 of the meter 1. The liquid volume expelled by the piston 11 from the capacity 8a is of course discharged through the duct 18. When the piston 11 arrives at the end of the measuring stroke the first carriage 24 will hit or meet a switch (not shown) which will operate the servo-system 16 to open the valve 14 again. The liquid arriving into the capacity 8b will flow again through the duct 13 to the valve 14 to flow out therefrom and to effect inside of the cavity 21 of the piston 11 as shown by dotted lines and arrows on FIG. 1 a return trip thereby reducing the velocity of the liquid jet and damping the stroke of the piston.

To reset the system the carriage 28 will be driven by the motor M until coming up to the carriage 24 which it will bring back to the position seen on FIG. 1 on FIG. 1 and the cycle may start again.

Now will be explained by means of FIG. 3 how the measurement is carried out.

Upon the displacement of the carriage 24 under the effect of the displacement of the piston 11 by the liquid issuing from the measuring member 2 the reading head 27 reading the incremental ruler 26 and both pulse generators $E_1$ and $E_2$ convey information to the computer C.

It should be noted here that irrespective of the position of the carriage 24, i.e. whether it is at rest or moving the pulse generators $E_1$ and $E_2$ will permanently transmit pulses to the computer C owing to the fact that the measuring member 2 permanently receives liquid at 6 even though the piston 11 is not moving.

In a first stage and upon a test run performed over a very large volume of liquid the computer C sets up the ratio existing between the numbers of pulses emitted by the generators $E_1$ and $E_2$ for a same period of time. This ratio will permit to determine the value of the drive ratio at the control system 4. Moreover the definition of the pulses emitted by the pulse generator $E_2$ corresponds to a known and constant value of liters read on the indicator 3. Consequently the computer C may quantize any number of pulses whatsoever emitted by the generator $E_1$ as a volume value read on the indicator 3 irrespective of the value of the drive ratio at the control system 4.

Upon the displacement of the carriage 24 hence of the reading head 27 on the ruler 26, said reading head moves past a position which determines the resetting of all the counting registers of the computer C and which is designated at 0 on FIG. 3.

It should be noted her that the measuring cycle is effected essentially over three zones $Z_1$, $Z_2$, $Z_3$ (FIG. 2) defined by four limits or positions(A, B, C, D) predetermined by the computer C and which constitute the limits or positions inside of which should compulsorily begin and end the gauging measurement. More precisely the measurement will start compulsorily in the first zone $Z_1$ at $D_1$ for instance and will compulsorily end in the third zone $Z_3$ at $D_3$ for instance whereas the intermediate zone $Z_2$ of stationary position and size will constitute a minimum value of the measurement so that owing to this arrangement the errors in measurement originating from measuring readings of the displacement of the piston are negligible since "lost" in a greater length of displacement of the piston.

The control or checking of the closing of the valve 14 by the switch 17 conveyed to the computer through the line 39 will take place before the first limit A of the start of measurement under penalty of disabling the next consecutive or following measurement, i.e. when the reading head 27 will move past the point E on the ruler 26 (FIG. 3).

Then the effective start of the measurement will take place at $D_1$ upon the appearance of the first rising edge emitted by the pulse generator $E_1$ which follows the first limit 1 on condition of enabling. The computer C will have predetermined in accordance with the known cyclic volume of the meter to be gauged a number of pulses corresponding to a whole number of cyclic volumes of the meter to be gauged provided that the number of pulses be consistent with the predetermined limits of end of measurement.

Beyond the clearing of the last limit D of end of measurement the reading head 27 would move past a predetermined constant position F constituting the control or check reference. The real distance between the control or check reference or position and the origin of all the measurements constitutes a gauging test. This test will advantageously allow the immediately foregoing measurement to be enabled or disabled.

At the end of its stroke the carriage 24 acts upon or biases a switch (not shown) urging the servo-system 16 to open the valve 14.

On FIG. 1 has been shown at G the space separating the beginning and the end of the measurement of the read volume determined by the pulse train emitted by the generator $E_1$ and processed by the computer C. The beginning of measurement 41 and the end of measurement 42 have allowed to count one pulse train emitted by the reading head 27 representing the distance travelled or covered by the plunger 11.

it should be pointed out at last that the ratio of the numbers of pulses emitted by the generators $E_1$ and $E_2$, this ratio being determined by the computer C over a large period of time may be calculated according to a masked time during the performance of the successive measurements.

There has therefore been provided according to the invention a method of and a system for gauging a liquid meter which allow to carry out a gauging with an outstanding accuracy and fidelity of measurement.

It should be understood that the invention is not at all limited to the embodiment described and shown which has been given by way of exemplary illustration only.

It should be noted in this connection that the principles of the invention may be applied not only to the gauging of volumetric meters but also to the gauging of turbine meters.

The invention therefore comprises all the technical equivalents of the means described as well as their combination if the same are carried out according to its gist and within the scope of the appended claims.

What is claimed is:

1. A device for gauging a volumetric liquid meter comprising a measuring member and a volume indicator, said device comprising a first pulse generator driven by the measuring member for generating a first pulse corresponding to the true volume passing into the measuring member, a second pulse generator driven by the volume indicator for generating a second pulse corresponding to the volume read by the indicator, means for forming a ratio of the number of the first and second pulses for comparing the value read by the volume indicator and the true volume passing into the measuring member, an enclosure containing a piston hydraulically connectable to said measuring member of said meter, said piston comprising a plunger piston having a cross-section smaller than the cross-section of said enclosure, said piston being slidably mounted in sealing relationship through an opening in at least one wall transversely mounted within said enclosure to define at least two fluid-tight capacities within said enclosure, wherein both capacities are connectable to a circuit for conveyance of liquid passing into said measuring member of said meter and both capacities communicate with each other through at least one duct provided with at least one valve arranged along a center line axis of the sliding motion of said piston, said valve allowing for a gradual flow of liquid from one capacity to the other capacity or discontinuance of the flow.

2. A device according to claim 1, wherein said piston is coupled to a first carriage slidable on guides in parallel relation to an incremental measuring ruler and which may be drawn back by a second powered carriage.

3. A device according to claim 1, wherein said piston has an inner cavity opening at one of the ends of the piston, said end being provided with an abutment adapted to co-operate with said valve.

4. A device according to claim 1, further comprising a tangential injection liquid inlet connected to one of said capacities of said enclosure.

5. A device according to claim 1, wherein said valve is associated with a system for checking said valve in a closing position.

6. A device according to claim 1, further comprising a duct associated with a pressure source, said duct communicating with an interface between said opening of said wall in which said piston slides and the outer surface of said piston, said duct opening between two sealing joints arranged within said opening.

* * * * *